Reissued Aug. 10, 1926. Re. 16,401

UNITED STATES PATENT OFFICE.

RANDOLPH CROMPTON, OF WORCESTER, MASSACHUSETTS.

METHOD OF WEAVING.

No Drawing. Original No. 1,514,686, dated November 11, 1924, Serial No. 579,532, filed August 3, 1922. Application for reissue filed January 12, 1926. Serial No. 80,848.

My invention pertains to a method of weaving having among its objects the elimination of waste and the employment of simpler mechanism than has heretofore been found practicable and will be best understood from the following specification describing by way of illustration one specific manner of employing my method, while the scope of my invention will be particularly pointed out in the appended claims.

Heretofore in using looms of the type wherein the weft carrier automatically is transferred it is common practice to employ in connection with the loom a feeler mechanism which is intended to cause the weft carrier to be transferred when it is exhausted. As a matter of fact, however, it is not practical absolutely to exhaust the weft, the feeler mechanism causing the transfer when about eight picks remain upon the carrier. After this stage is reached the carriers are cleaned of the remaining weft and are then rewound. In the aggregate the loss of weft incident to this method is considerable, especially in mills employing a large number of looms, and further although in some cases the method is eminently practical yet in many cases the application of the feeler mechansm to the loom results in an objectionable complexity of mechanism. It is among the objects of my invention to eliminate both the waste and complexity of mechanism incident to this method.

In carrying out my method I employ in connection with the automatic loom a measuring device which will cause the weft carriers to be transferred at measured intervals, for example after a predetermined number of picks have been removed therefrom, which number for example is the same for each carrier, the operation being distinguished from the method which employs feeler mechanism in that the transfer is not dependent upon the number of picks remaining upon the carrier.

As measuring devices for causing the weft carriers, that is to say for example the bobbin, or shuttle and bobbin, to be transferred or changed at measured intervals are known, it is believed unnecessary to describe one. An example of a loom equipped with a measuring device for this purpose is shown in my United States Patent No. 600,121 granted March 1, 1898.

Heretofore it has been impossible to put into practice automatic looms equipped with measuring devices because of the great loss of weft incident to their use. A measuring device will cause transfer of the carrier, as heretofore stated, for example after a predetermined number of picks have been removed, but owing principally to the unavoidable stretch in the weft in the weaving operation it is impossible to determine how to set the measuring device so that the carriers will be transferred when nearly exhausted. For this reason measuring devices, in spite of their simplicity over feeler devices that rely upon mechanical feeling contact with the weft to determine the time of transfer, have not been used in practice.

According to the present illustrative example of my invention I first wind the carriers by suitable winding machinery, say in a so-called universal winding machine, and then select a number of carriers, say for example one hundred, which by inspection represent those turned out by the winding machine as having a minimum number of picks thereon. I then make a test run with these carriers and by measurement of the fabric woven and counting of the picks determine what I may expect to be the minimum number of picks on a carrier. The measuring device on the loom is then set to cause the loom to transfer the carriers after a number of picks considerably less than this minimum have been removed from the carriers, this of course allowing for stretch and for any carrier which by chance may contain less picks than what has been shown by my test weave. It will be noted that my carriers as a result of this are transferred with a considerable amount of weft thereon, say as many as sixty or seventy picks, as distinguished from the method now in practice whereby the carriers are transferred with eight or less picks thereon. A further step in my method consists in taking the transferred carriers back to the universal winding machine, and without cleaning them, tying the loose ends of the remaining weft thereon to the reservoir of weft in the winding machine and winding an amount of weft of the same kind thereon equal to that which the measuring device on the loom is set to cause to be removed, the winding machine of course being provided with supplies of weft corresponding in color, weight, etc. to the various kinds of weft woven into the fabric produced in a given loom. In other words the winding machine is set to wind a length of weft equal to that which the measuring device on the loom is set to remove, consequently each individual carrier may always be returned to the loom with substantially the same amount of weft thereon.

It will be noted by my method that not only am I enabled to employ the much simpler measuring device but that waste of weft is absolutely eliminated.

Although I have described for purposes of illustration one way of carrying out my method it is to be understood that I am not limited thereby to its exact details, but that wide deviations may be made therefrom without departing from the spirit of my invention.

Claims—

1. That method of weaving on looms having measuring devices for causing transfer of weft carriers after a predetermined number of picks, comprising winding the weft upon a series of carriers; selecting a large number of such wound carriers; making a test run with all said selected carriers; determining the number of picks in the resulting woven fabric; thus determining the minimum number of picks on a carrier; then setting the measuring device to cause transfer after a number of picks considerably less than said minimum, thereby allowing for stretch of the weft; then placing the transferred carriers in a winding machine and tying the loose end of the weft remaining on such carriers to the supply in said winding machine; then winding on each carrier an amount of weft equal to that which the measuring device upon the loom is set to function at; and finally weaving with said rewound carriers.

2. That method of weaving on weft carrier transferring looms having measuring devices for effecting the transfer of carriers after a predetermined number of picks as indicated by said measuring device, comprising, winding a series of carriers in a winding machine; selecting a relatively large number of wound carriers determined by inspection to have a minimum number of picks wound thereon; then making a test run with all of said carriers; then measuring the resulting woven fabric and counting the picks, thereby determining the minimum number of picks on the carrier; then setting the measuring device to cause transfer after a number of picks relatively less than the determined minimum, thereby allowing for stretch, etc.; then placing the discharged carriers in a winding machine and tying the loose end of the weft remaining on said carriers to the reservoir of weft in said machine; then winding an amount of weft onto each carreir equal to that which the measuring device on the loom is set to function at, and finally weaving with said rewound carriers.

3. That method of weaving on weft carrier transferring looms having measuring devices for transferring the carriers after a predetermined number of picks as indicated by said measuring device, which comprises winding a large number of carriers in a so-called universal winding machine; then selecting approximately one hundred wound carriers which by inspection have a minimum number of picks wound thereon; then making a test run with all of said carriers; then measuring the resulting woven fabrics and counting the picks, thus determining the minimum number of picks upon a carrier; then setting the measuring device to cause transfer after a number of picks considerably less than said minimum, thereby allowing for stretch of the weft, etc., thus resulting in transfer with fifty or more picks left upon each carrier; then placing the discarded carriers in the so-called universal winding machine and tying the loose end of the weft remaining on said carriers to the weft supply in said winding machine, and winding an amount of weft upon each of said carriers equal to that which the measuring device on the loom is set to function at, and then weaving with such carriers.

4. That improvement in the continuous production of woven fabrics upon automatic weft carrier transferring looms which comprises the employment of a plurality of carriers, using said carriers in weaving by said looms, transferring said carriers prior to substantial exhaustion of the weft thereon and inserting rewound carriers at measured intervals irrespective of the amounts of the remnants of weft remaining upon said carriers, securing the ends of new supplies of weft of the same kind to the ends of the remnants remaining upon the carriers, and rewinding upon the respective carriers lengths of weft substantially equal to those removed by the weaving preparatory to reuse in the weaving.

5. That improvement in the continuous production of woven fabrics upon automatic looms which comprises employing a plurality of automatic weft carrier transferring looms, winding machinery for winding the weft upon the carriers for said looms, and measuring means to effect at intervals transfer of the carriers in said looms prior to substantial exhaustion of weft thereon irrespective of the amounts of the remnants of weft remaining upon said carriers; removing said carriers after transfer thereof to the winding machinery, securing the ends of the remnants of weft on the carriers to new supplies of weft of the same kind for said winding machinery and rewinding the carriers, and coordinating the rewinding to the depletion of the carriers by the weaving to cause said winding machinery to rewind the respective carriers by lengths of weft substantially equal to the lengths of weft by which they had been depleted by the weaving, whereby to effect substantially continuous weaving of the fabric without waste of weft and without necessary mechanical contact with the weft to determine the time of transfer of said carriers.

6. That improvement in the continuous production of woven fabrics upon automatic looms which comprises employing a plurality of automatic weft carrier transferring looms, winding machinery for winding the weft upon the carriers for said looms, and measuring means to effect transfer of the carriers in said looms at intervals determined by depletion of the amounts of weft on the carriers by a predetermined number of picks irrespective of the amounts of the remnants of weft remaining upon said carriers; removing said carriers after transfer thereof to the winding machinery, securing the ends of the remnants of weft on the carriers to new supplies of weft of the same kind or said winding machinery and rewinding the carriers, and coordinating the rewinding to the depletion of the carriers by the weaving to cause said winding machinery to rewind the respective carriers by lengths of weft substantially equal to the lengths of weft by which they had been depleted by the weaving, whereby to effect substantially continuous weaving of the fabric without waste of weft and without necessary mechanical contact with the weft to determine the time of transfer of said carriers.

7. That improvement in the continuous production of woven fabrics upon automatic weft carrier transferring looms which comprises transferring the carriers at measured intervals irrespective of the amounts of the remnants of weft remaining thereon, securing the ends of the remnants of weft thereon to new supplies of weft of the same kind and rewinding the same, and coordinating the rewindings to the amounts of weft removed in weaving to rewind upon the carriers at each rewinding lengths of weft sufficient to prevent substantial exhaustion of the weft thereon at the times of succeeding transfer.

8. That improvement in the continuous production of woven fabrics upon automatic weft carrier transferring looms which comprises transferring said carriers in the looms prior to substantial exhaustion of weft, securing the ends of new weft of the same kind to the ends of the remnants on the depleted carriers to avoid waste of weft, and rewinding the respective carriers with the new weft to the extent of weft removed in weaving irrespective of the length of the remnants upon the carriers when transferred.

9. That improvement in the continuous production of woven fabrics upon automatic looms which comprises employing a plurality of automatic weft carrier transferring looms, winding machinery for winding the weft upon the carriers for said looms, and means to effect at measured intervals transfer of the carriers in said looms irrespective of the amounts of the remnants of weft remaining upon said carriers; removing said carriers after transfer thereof to the winding machinery, securing the ends of the remnants of weft on the carriers to new supplies of weft of the same kind for said winding machinery and rewinding the carriers, and coordinating the rewindings to the amounts of weft removed in weaving to rewind upon the carriers at each rewinding lengths of weft sufficient to prevent substantial exhaustion of weft thereon at the times of succeeding transfer.

In testimony whereof I have signed my name to this specification.

RANDOLPH CROMPTON.